United States Patent [19]

Kosugi

[11] 4,158,887

[45] Jun. 19, 1979

[54] CURVE GENERATOR FOR GENERATING A SMOOTH CURVE WITH A PAIR OF CIRCULAR ARCS BETWEEN TWO GIVEN POINTS

[75] Inventor: Makoto Kosugi, Higashiyamato, Japan

[73] Assignee: Nippon Telegraph and Telephone Public Corp., Tokyo, Japan

[21] Appl. No.: 826,965

[22] Filed: Aug. 22, 1977

[30] Foreign Application Priority Data

Aug. 20, 1976 [JP] Japan .................................. 51-99254

[51] Int. Cl.² ............................................ G06F 15/34
[52] U.S. Cl. ................................................. 364/723
[58] Field of Search ................. 364/723, 577; 318/573

[56] References Cited

U.S. PATENT DOCUMENTS

| 3,109,092 | 10/1963 | Lott et al. | 364/723 |
| 3,644,723 | 2/1972 | Rosener | 364/723 X |
| 4,031,369 | 6/1977 | Heaman et al. | 364/723 X |

OTHER PUBLICATIONS

K. M. Bolton, "Biarc Curves," *Computer Aided Design*, vol. 7, No. 2, Apr. 1975, pp. 89-92.

*Primary Examiner*—David H. Malzahn
*Attorney, Agent, or Firm*—Armstrong, Nikaido, Marmelstein & Kubovcik

[57] ABSTRACT

A curve generator for generating a smooth curve with a pair of circular arcs between the two given points $P_1$ and $P_2$ on the condition that the generated curve is tangent with the given tangent lines $M_1$ and $M_2$ at said points $P_1$ and $P_2$, comprises means for defining the coordinates of the point Q of the connection of said pair of arcs on the locus satisfying the formula $$\angle P_1 Q P_2 = \pi - \tfrac{1}{2}(\theta_1 + \theta_2)$$

where $\theta_1$ and $\theta_2$ are angles between the line $\overline{P_1 P_2}$ and the tangent lines $M_1$ and $M_2$ respectively. Either the major arc or minor arc between the points $P_1$ and Q, and between the points Q and $P_2$, that is to say, the revolutional direction of each arc is selected. Thus, a pair of arcs $\widehat{P_1 Q}$ and $\widehat{Q P_2}$ connect the two given points $P_1$ and $P_2$ smoothly.

5 Claims, 17 Drawing Figures

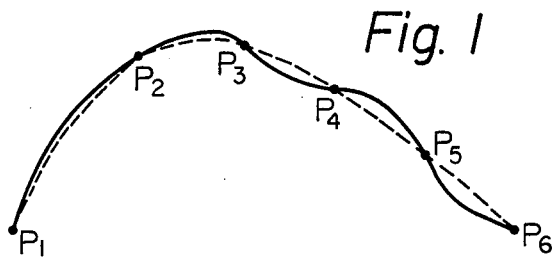
Fig. 1
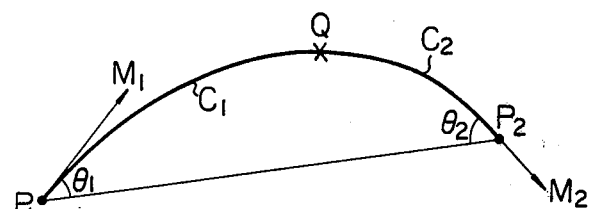
Fig. 2
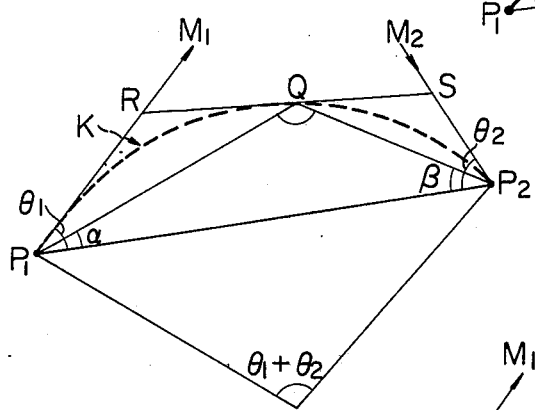
Fig. 3
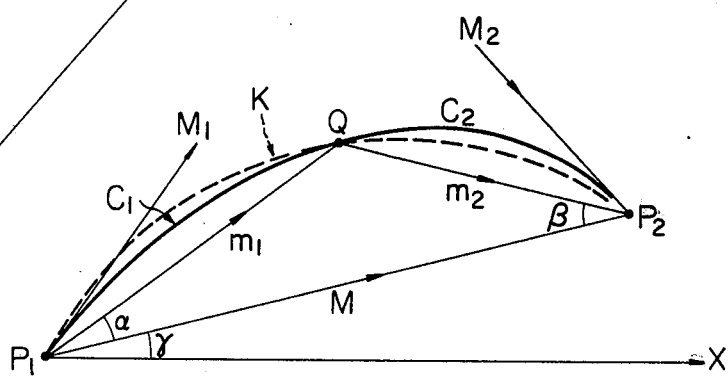
Fig. 4
Fig. 6
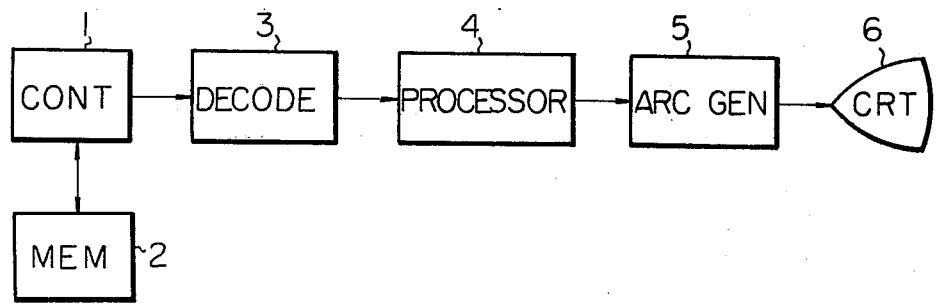

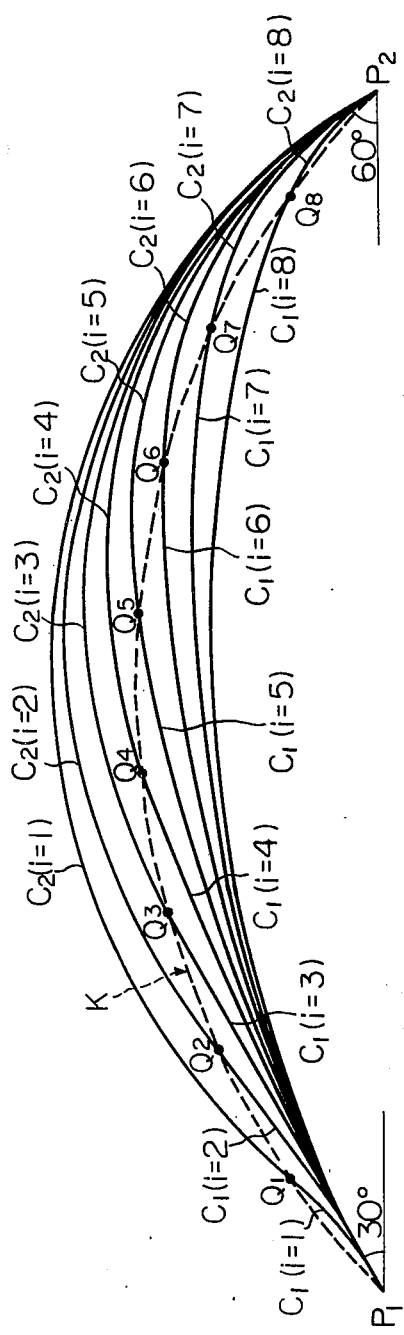

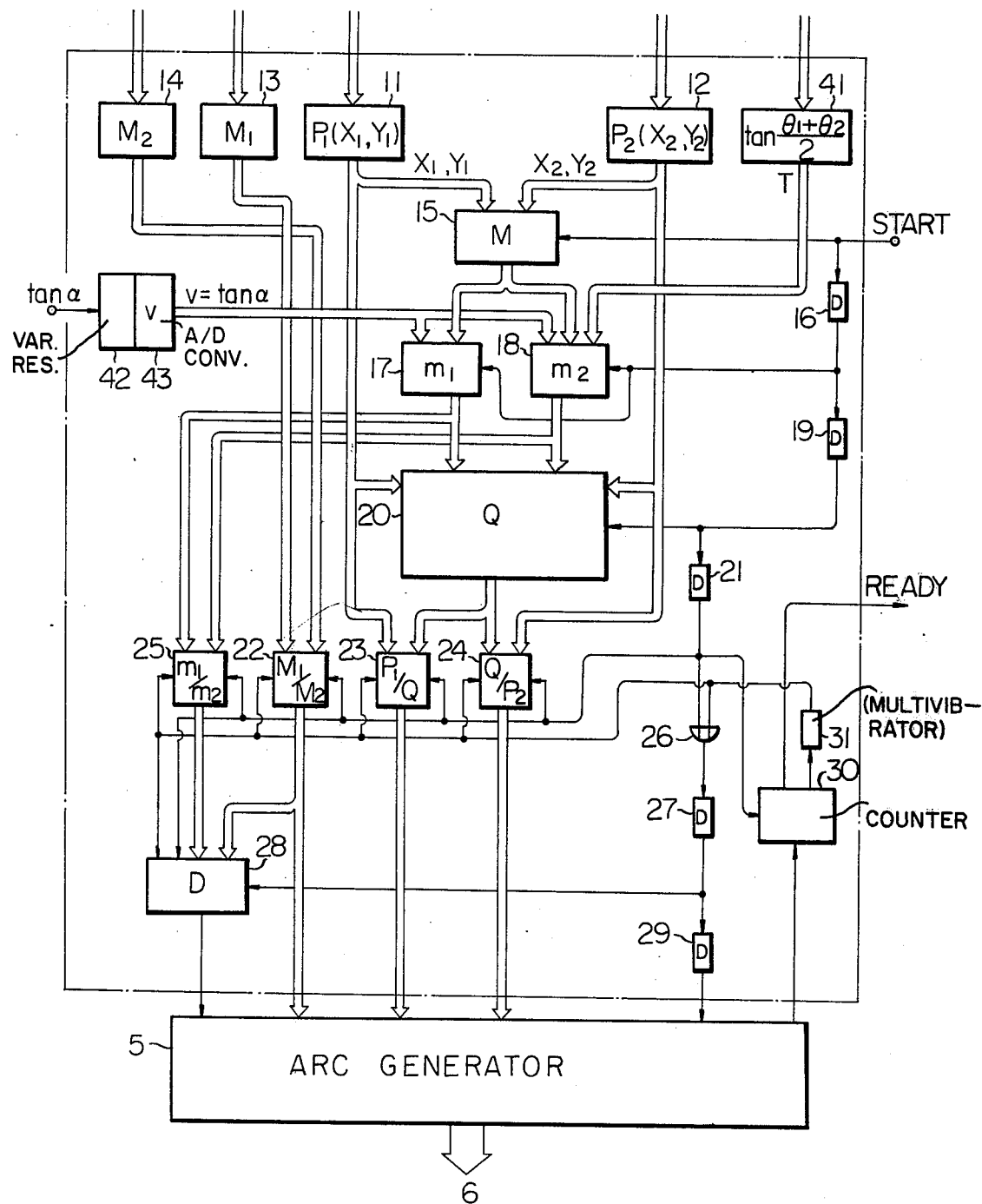

CURVE GENERATOR FOR GENERATING A SMOOTH CURVE WITH A PAIR OF CIRCULAR ARCS BETWEEN TWO GIVEN POINTS

BACKGROUND OF THE INVENTION

The present invention relates to a curve generator, in particular, relates to a curve generator for generating a plurality of smooth arcs in a graphic display device.

A prior graphic display device displays an approximate curve by generating a plurality of short linear lines or short vectors. However, said prior art has the disadvantages that the data or the short vectors required are very voluminous, thus the amount of memory for storing said data and the duration of time for displaying and/or transmitting the curve are very large. Further, the curve thus obtained by the approximation of a plurality of short vectors is not sufficiently smooth. To obtain a smoother curve, more data is required.

Other prior curve generators are, for instance, an analog integrator type curve generator (Timothy E. Johnson; "Analog Generator for Real-Time Display of Curves", Technical Report No-398, Lincoln Laboratory, MIT, 1965), and a digital curve generator with the combination of digital differential analyzers (James R. Armstrong; "Design of a Graphic Generator for Remote Terminal Application", IEEE Transactions for Computers, Vol. C-22, No. 5, 1973). However, those prior arts have the disadvantages that the structure or the circuit is very complicated and only a very limited curve can be generated by those curve generators, and thus those prior arts are not practicable.

Another prior art attempted to display a curve with a plurality of arcs. However, according to a prior arc type curve generator, a profile of a curve is defined uniquely by the coordinates of the whole given points and the tangential line at the start point, thus the curves thus generated have the undesired oscillatory phenomenon as shown in FIG. 1, in which the dotted line shows an ideal curve. That oscillatory phenomenon is discussed in detail in "An approximation of a curve with circular arcs", by T. Kamae and M. Kosugi, Information Processing Society of Japan, Vol 12, 1972. If an oscillatory phenomenon occurs, the generated curve oscillates as shown in FIG. 1, although it is smooth in a short section. Accordingly, a curve generator which generates a curve using a plurality of arcs has not been implemented in spite of the simple structure of same.

Other prior curve generators are U.S. Pat. No. 3,860,805, U.S. Pat. No. 3,325,630, and British Pat. No. 866,319. Those prior arts generate a curve between two points using a plurality of parabola or linear lines, and have the disadvantages that the structure of the curve generator is complicated and the curve thus generated is not sufficiently smooth.

Another prior art for generating a curve between two points is "Biarc Curves" by D. M. Bolton, (British Ship Research Association), Computer Aided Design, Vol 7, No. 2, 1975 (British publication). Although that document suggests a curve generator which connects two points by a pair of arcs, that document does not refer to the locus of the junction point of the two arcs. Therefore, the flexibility of a curve thus generated is very limited, and further the calculation for obtaining a curve is rather complicated resulting a complicated device.

SUMMARY OF THE INVENTION

It is an object of the present invention, therefore, to overcome the disadvantages and limitations of prior curve generators by providing a new and improved curve generator.

The present curve generator for fulfilling the above object provides a curve having a pair of arcs connecting two given points $P_1$ and $P_2$ smoothly on the condition that the generated curve is tangent with the given lines $M_1$ and $M_2$ passing through said points $P_1$ and $P_2$, and the present curve generator comprises means for defining the coordinates of the junction point Q of said pair of arcs on the locus satisfying the formula $$\angle P_1 Q P_2 = \pi - \tfrac{1}{2}(\theta_1 + \theta_2),$$

where $\theta_1$ and $\theta_2$ are angles between the line $\overline{P_1 P_2}$ and the tangent lines $M_1$ and $M_2$ respectively; means for deciding the revolutional direction of each arc, and means for generating an arc according to the output of said two means.

BRIEF DESCRIPTION OF THE DRAWINGS

The foregoing and other objects, features, and attendant advantages of the present invention will be appreciated as the same become better understood by means of the following description and the accompanying drawings wherein;

FIG. 1 is the explanatory drawing showing the oscillatory phenomenon when a single arc is used between each adjacent two points in a prior art, FIG. 2 shows a curve connecting two points by a pair of arcs satisfying the tangent lines at said two points, according to the present invention, FIG. 3 is the explanatory drawing showing the mathematical analysis of the locus of the junction point of a pair of arcs according to the present invention, FIG. 4 is the example of a curve connecting two points by a pair of arcs, FIG. 5 shows a group of possible curves each connecting two points by a pair of arcs according to the present invention, FIG. 6 is a block-diagram of a curve generator according to the present invention, FIG. 7 is a detailed block-diagram showing the curve processor 4 in FIG. 6.

DESCRIPTION OF THE PREFERRED EMBODIMENTS

Figure 8:
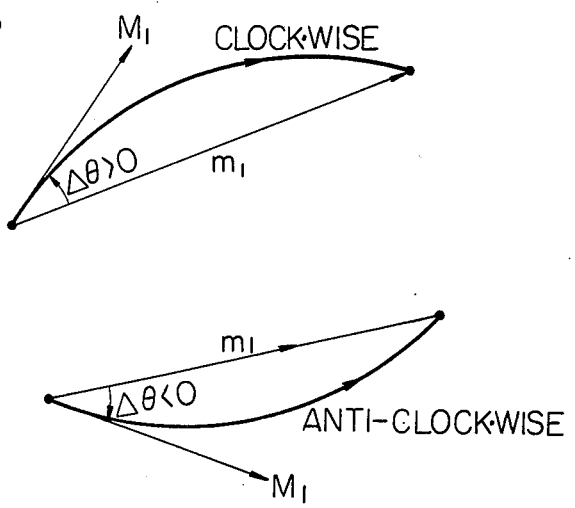
FIG. 8 is the explanatory drawing showing the decision of the proper revolutional direction of an arc according to the present invention.

First, the mathematical principle that when the coordinates of the two points and a pair of tangent lines at those points are given, a curve with a pair of arcs can connect said two points smoothly, will be explained in accordance with FIG. 2 to facilitate understanding of the present invention.

In FIG. 2 the two points are designated $P_1$ and $P_2$, the tangent lines at those points are $M_1$ and $M_2$, and the angles between the line $\overline{P_1P_2}$ and the tangent lines $M_1$, $M_2$ are $\theta_1$ and $\theta_2$, respectively. In the above designation, the curve with a pair of arcs $C_1$ and $C_2$, which are tangential with the tangent line $M_1$ at point $P_1$ and the tangent line $M_2$ at point $P_2$, respectively, can connect those points $P_1$ and $P_2$. That is to say, when the junction point Q of the arcs $C_1$ and $C_2$ is defined, the tangent line of the arc $C_1$ at point Q can be the same as the tangent line of the arc $C_2$ at point Q. And further, the point Q is not a stationary point, but can move on the locus.

FIG. 3 shows the mathematical analysis of said locus of the junction points of a pair of arcs. In FIG. 3, it is supposed that $\angle QP_1P_2=\alpha$, $\angle QP_2P_1=\beta$, the cross points of the tangent line at point Q and the tangent lines $M_1$, $M_2$ are R and S, respectively. Since the formula below $$\angle RQP_1 + \angle P_1QP_2 + \angle P_2QS = \pi$$

is satisfied, the other formula below is introduced from the above formula.

$$\angle P_1QP_2 = \pi - \tfrac{1}{2}(\theta_1+\theta_2) = \text{(const)}$$

That is to say, the point Q resides on the locus of the constant circle K on which the angle of Q for the line $\overline{P_1P_2}$ is constant.

The center O of the circular arc K is on the perpendicular bisector of the line $\overline{P_1P_2}$, and $\angle P_1OP_2 = \theta_1+\theta_2$ is satisfied, as shown in FIG. 3. Also, $\alpha+\beta = \tfrac{1}{2}(\theta_1+\theta_2)$ is satisfied. Accordingly, as apparent from FIG. 4, a pair of arcs $C_1(\overline{P_1Q})$ and $C_2(\overline{QP_2})$ can be connected smoothly using the point Q. In FIG. 4, $m_1$ is the slope of the line $\overline{P_1Q}$, $m_2$ is the slope of the line $\overline{QP_2}$, M is the slope of the line $\overline{P_1P_2}$, and $\gamma$ is the angle $\angle P_2P_1X$.

It should be noted that there can be infinite number of curves which have said arcs $C_1$ and $C_2$ passing through the point Q, since the point Q can move the entire length from the point $P_1$ to the point $P_2$ on the locus K.

FIG. 5 shows some examples of the generated curves according to the present invention. The curves having a pair of arcs $C_1(i)$ ($i=1\sim 8$) and $C_2(i)$ ($i=1\sim 8$) passing through the point $Q_1$ ($i=1\sim 8$). It is supposed in FIG. 5 that $\theta_1=30°$, $\theta_2=60°$, $\alpha_i = \angle Q_iP_1P_2 = (9-i/9)(\theta_1+\theta_2)/2 = 5(9-i)$, $i=1, 2, \ldots, 8$. It is one of the features of the present invention that a plurality of curves can be generated according to the value of the parameter $\alpha$. Further, it should be noted that the sign of the curvature of the arcs $C_1$ and $C_2$ is not defined, therefore, not only a convex curve between the points $P_1$ and $P_2$, but also a curve having an inflection point between the points $P_1$ and $P_2$ can be possible. The latter curve can also satisfy the condition of the tangential lines $M_1$ and $M_2$ at the points $P_1$ and $P_2$, respectively, by using the point Q on the locus K.

FIG. 6 is the block-diagram of the curve generator according to the present invention. In FIG. 6, the reference numeral 1 is a display control unit, 2 is a memory for storing the display data, 3 is a curve decoder, 4 is a curve processor which is the most important unit in the present invention, 5 is an arc generator, 6 is a display unit with a Cathode-Ray-Tube. The display control unit 1 receives the display data from the memory 2, and the curve decoder 3 decodes the curve display instruction from the display data and applys the data necessary for the generation of a curve to the curve processor 4. Said data necessary for the generation of a curve is, in the present embodiment, the coordinates of the point $P_1(X_1, Y_1)$, the coordinates of the point $P_2(X_2, Y_2)$, the slope of the tangent line $M_1$ at the point $P_1$, the slope of the tangent line $M_2$ at the point $P_2$, the value of $\tan(\theta_1+\theta_2)/2$, and the value of $\tan\alpha$ which defines the location of the point Q on the locus K. It should be appreciated that the circuit of the curve generator will be quite simplified in structure when $\alpha$ and $\beta$ are designed to be $\theta_1/2$ and $\theta_2/2$, respectively.

The curve processor 4 processes the above data and generates first the data for the first arc and applys the same to the arc generator 5, then the arc generator 5 generates the first arc and displays the same on the screen of the display unit 6. Next, the display unit receives the data for displaying the second arc from the curve processor 4 and displays the second arc on the screen. Thus the curve having a pair of curves connected smoothly is displayed on the screen.

FIG. 7 is the block-diagram showing in detail the structure of the curve processor 4. In FIG. 7, the reference numeral 11 is a start point register, 12 is an end point register, 13 is a start point tangent register, 14 is an end point tangent register, 15 is a slope calculator, 16 is a delay circuit, 17 is an $m_1$ calculator, 18 is an $m_2$ calculator, 19 is a delay circuit, 20 is a Q calculator, 21 is a delay circuit, 22, 23, 24 and 25 are selectors, 26 is an OR-circuit, 27 is a delay circuit, 28 is a direction circuit, 29 is a delay circuit, 30 is a binary-counter, 31 is a single-shot circuit. Further, the reference numeral 41 is a register for storing the value $\tan(\theta_1+\theta_2)/2$, 42 is a variable resistor, and 43 is an analog-digital convertor.

In the present invention, it is supposed that the point Q on the locus K is specified by defining the value $\alpha$ (or $\tan\alpha$) in FIGS. 3 or 4. Said parameter $\tan\alpha$ is directly applied to the curve processor 4. Of course said parameter $\tan\alpha$ can also be applied from the decoder 3. Further, the value $\tan(\theta_1+\theta_2)/2$ which is used for the calculation of $m_2$ could be calculated in the curve processor 4 from the values $M_1$ and $M_2$, although said value is applied to the curve processor 4 from the decoder 3 in the present embodiment.

As explained above, the coordinates of the start point $P_1$ are $(X_1, Y_1)$, the coordinates of the end point $P_2$ are $(X_2, Y_2)$, the tangent lines at the points $P_1$ and $P_2$ are $M_1$ and $M_2$ respectively, and the angles between the tangent lines $M_1$ and $M_2$ and the line $\overline{P_1P_2}$ are $\theta_1$ and $\theta_2$, respectively.

The curve processor 4 receives the data necessary for the calculation of the curve from the decoder 3 when the curve display instruction is decoded in the decoder 3. That is to say, the register 11 receives the coordinates $(X_1, Y_1)$ of the point $P_1$, the register 12 receives the coordinates $(X_2, Y_2)$ of the point $P_2$, the register 13 receives the tangent $M_1$ at the point $P_1$, the register 14 receives the tangent $M_2$ at the point $P_2$, and the register 41 receives the value $(\theta_1+\theta_2)$. Further, the rotational angle of the variable resistor 42 provides the value $v = \tan \alpha$, which is converted to a digital value by the digital-analog converter 43.

When all the data mentioned above are applied to the curve processor 4, the start pulse (START) is applied to the curve processor 4 from the decoder 3. The start pulse (START) triggers first the slope calculator 15, which then calculates the slope M of the line $\overline{P_1P_2}$ according to the equation $$M = (Y_2 - Y_1)/(X_2 - X_1)$$

using the coordinates of the points $P_1$ and $P_2$ in the registers 11 and 12.

Next, the start pulse (START) triggers the $m_1$ calculator 17 and the $m_2$ calculator 18 through the delay circuit 16, where $m_1$ and $m_2$ are slopes of the lines $\overline{P_1Q}$, and $\overline{QP_2}$ in FIG. 4, respectively. First, the calculation of the value $m_1$ will be explained. The formula for the calculation of $m_1$ is shown below.

$$m_1 = \tan(\gamma + \alpha) = (M + \tan \alpha)/(1 - M\tan \alpha)$$

As the angle between the tangent line $M_1$ and the line $\overline{P_1P_2}$ is $\theta_1$, and the angle between the tangent line $M_2$ and the line $\overline{P_1P_2}$ is $\theta_2$, then the value $\tan \gamma$ which is the slope M of the line $\overline{P_1P_2}$ in FIG. 4 (line $\overline{P_1X}$ shows the reference direction of an angle) provides the above formula. Accordingly, the $m_1$ calculator 17 calculates the value $m_1$ from the values M and $v = \tan \alpha$. The detailed structure of the $m_1$ calculator 17 will be shown later.

On the other hand, the tangent $m_2$ of the line $\overline{QP_2}$ is obtained as follows.

$$m_2 = \tan(\gamma - \beta) = (M - \tan \beta)/(1 + M\tan \beta)$$

Since $\alpha + \beta = \frac{1}{2}(\theta_1 + \theta_2)$, mentioned before, the value of $\tan \beta$ is $$\tan \beta = (T - v)/(1 + Tv)$$

where $v = \tan \alpha$, and $T = \tan(\theta_1 + \theta_2)/2$.

Accordingly, the $m_2$ calculator 18 receives the value v from the analog-digital convertor 43, and $T = \tan(\theta_1 + \theta_2)/2$ from the register 41, then calculates $\tan \beta$ first, and next calculates the value $m_2$ using said $\tan \beta$ and the value M from the slope calculator 15. The detail of the $m_2$ calculator 18 will be shown later.

The values $m_1$ and $m_2$ thus calculated are stored in the registers (not shown) in the $m_1$ calculator 17 and the $m_2$ calculator 18 respectively. It should be appreciated of course that the other calculators in FIG. 7 have registers for storing the calculation result although they are not shown for the sake of simplicity.

Next, the start pulse (START) which triggered the $m_1$ calculator 17 and the $m_2$ calculator 18 triggers the Q calculator 20 through the delay circuit 19. Then, the Q calculator 20 receives the coordinates of the points $P_1$ and $P_2$, and the tangents $m_1$ and $m_2$, then calculates the coordinates of the point Q $(X_q, Y_q)$ which is the cross point of the line $m_1$ and the line $m_2$, in the following formula.

$$X_q = (Y_2 - Y_1 + m_1X_1 - m_2X_2)/(m_1 - m_2)$$

$$Y_q = (m_1Y_2 - m_2Y_1 + m_1m_2X_1 - m_1m_2X_2)/(m_1 - m_2)$$

When the coordinates of the junction point $Q(X_q, Y_q)$ are calculated said start pulse (START) controls the selectors 22, 23, 24 and 25 through the delay circuit 21 so that those selectors provide the data for the first arc (the arc $C_1$ in FIG. 4). The start pulse also clears the binary counter 30 to "00". Those selectors include the registers for storing the above data, and the integrated circuit for constructing the selector is for instance SN7429 produced by Texas Instruments Co., Ltd. The selector 23 stores the coordinates of the start point of the first arc $P_1(X_1, Y_1)$, and the selector 24 stores the coordinates of the end point of the first arc $Q(X_q, Y_q)$, the selector 22 stores the data of the tangent line $M_1$ at the point $P_1$ of the first arc, and the selector 25 stores the data $m_1$ which defines the revolutional direction of the first arc or selects either the major arc or minor arc for the first arc from the entire circle. Next, the start pulse (START) triggers the direction circuit 28 through the OR-circuit 26 and the delay circuit 27. The direction circuit 28 thus triggered receives the value $m_1$ from the selector 25, and the value $M_1$ from the selector 22, then defines the revolutional direction of the first arc. When it is assumed that the length of the arc is less than a semi-circle as is generally used, the sign of the value D calculated throuth the following formula can define the revolutional direction of the arc.

$$D = (M_1 - m_1)/(1 + M_1m_1)$$

That is to say, when the sign of the value D is positive, the arc rotates in the clock-wise direction, and when the sign of the value D is negative, the arc rotates in the anti-clock-wise direction. FIG. 8 explains the above situation, that is, when angle difference, $\Delta\theta = M_1 - m_1$ is defined, the sign of the value $\Delta\theta$ coincides with the sign of $\tan \Delta\theta$ so long as $|\Delta\theta| < (\pi/2)$ is satisfied. However, please note that the inverse of the sign described later is not performed in the direction circuit 28 when the selectors 22, 23, 24, 25 select the data for the first arc. Although the above embodiment presumes that the length of the arc is less than a semi-circle, the longer arc can be available. When the arc is greater than a semi-circle, the values of $\Delta X$, and $\Delta Y$ of the tangent line, instead of the tangent value of the tangent line, as the data of the tangent line, can be used for calculating the revolutional direction of the arc.

Now, the data for the first arc are provided to the arc generator 5 from the curve processor 4 and said start pulse (START) triggers the arc generator 5.

The arc generator 5 generates the arc according to the data supplied to the same. An arc generator is well known and the arc generator 5 can be any one of those well known arc generators. In some cases, an arc generator requires the coordinates of the start point of the arc, the coordinates of the end point of the arc, the coordinates of the center of the arc, and the revolutional direction of the arc (for instance, Vector General Inc, CAG—1 type arc generator), as the input date to the arc generator, instead of the data explained in FIG. 7. In that case, the coordinates of the center of the arc $(X_0, Y_0)$ are calculated from the output of the apparatus in FIG. 7 through the following formula.

$$X_O = \frac{m_iM_i(Y_{mi} - Y_i) + M_iX_{mi} - m_iX_i}{M_i - m_i}$$

$$Y_O = \frac{M_iY_i - m_iY_{mi} + X_i - X_{mi}}{M_i - m_i}$$

where $i = 1$ or 2 designating first or second arc, $$X_{mi}=(X_i+X_q)/2$$

$$Y_{mi}=(Y_i+Y_q)/2$$

$$m_i=(Y_q-Y_i)/(X_q-X_i)$$

It should be appreciated that the data conversion as explained above for the interface of the curve processor with an arc generator is obvious to those skilled in the art.

When the generation of the first arc is finished, the arc generator 5 provides the end pulse, which changes the content of the binary counter 30 to "01", so that the less significant digit of the binary counter 30 allows the selectors 22, 23, 24, 25 to provide the data for the second arc ($C_2$), through the single-shot multivibrator 31. That is to say, the selectors in that situation, provide the coordinates of the start point Q, the coordinates of the end point $P_2$, the tangent line $M_2$ at the point $P_2$, and the slope $m_2$ of the line $\overline{QP_2}$.

The operation for generating the second arc is the same as that for the first arc except for the revolutional direction (note; $D_2=(M_2-m_2)/(1+M_2m_2)$). That is to say, the selectors 22, 23, 24 and 25 provide the data for the second arc to the arc generator 5, which generates the second arc. However, since the tangent $M_2$ at the end point is used for defining the revolutional direction of the second arc, when the sign of the difference $m_2-M_2$ is positive, the arc rotates in the clock-wise direction, and when the difference is negative, the arc rotates in the anti-clock-wise direction. Accordingly, the direction circuit 28 must change the sign for the second arc. Thus, when the start pulse (START) switches the selectors 22~25 to the second arc, said start pulse (START) changes the sign of the output of the direction circuit 28. The detailed structure of the direction circuit 28 will be shown later.

When the second arc is generated, the arc generator 5 provides the end pulse, which changes the content of the binary counter 30 to "10". In this case the single-shot circuit 31 is not triggered and the pulses to the selectors 22, 23, 24 and 25 are inhibited. Further, the output of the binary counter 30 is applied to the "READY" terminal, which informs the curve decoder that the next curve display can be prepared. Thus, the complete cycle for generating a curve having a pair of arcs connected smoothly has finished. As apparent from the above explanation, when a train of points and the tangent at each points are given, a curve segment having a pair of arcs is produced between each adjacent two points, and thus all the given points are connected by a continuous smooth curve having a plurality of arcs.

Now, the detailed structure of the members 15, 17, 18, 20 and 28 which are shown in FIG. 7 will be described.

Figure 9:
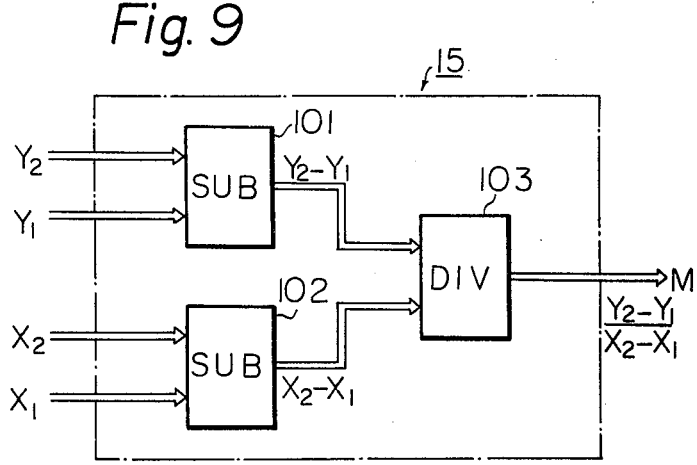
FIG. 9 is a block-diagram of a slope calculator 15 in FIG. 7.

FIG. 9 shows the embodiment of the slope calculator 15, which is composed of a pair of subtractors (SUB) 101 and 102 for producing $Y_2-Y_1$ and $X_2-X_1$, respectively, and a divider 103 for calculating ($Y_2-Y_1$)/($X_2-X_1$) from the output of said subtractors. In FIG. 9, the upper input line and the lower input line of the subtractors (SUB) 101 and 102 receive the minuend ($Y_2, X_2$), and the subtrahend ($Y_1, X_1$), respectively, and the upper line and the lower line of the divider 103 receive the dividend and the divisor respectively. The detailed structure of the subtractor and the divider will be shown later.

Figure 10:
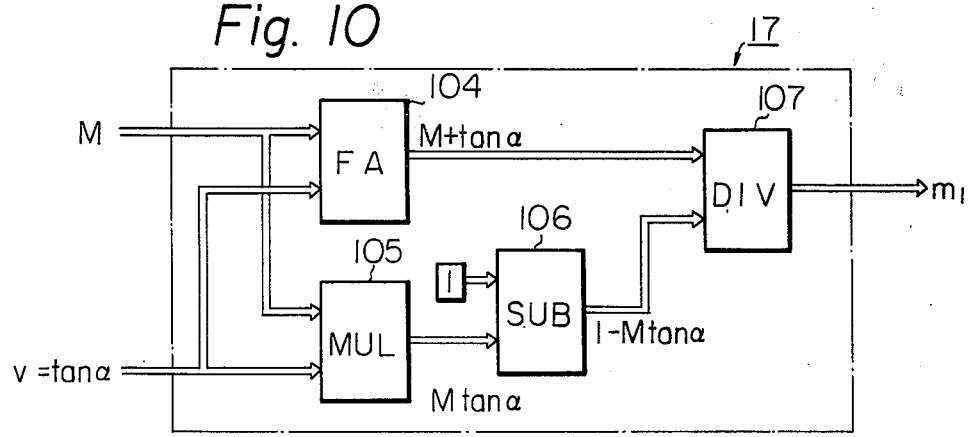
FIG. 10 is a block-diagram of an $m_1$ calculator 17 in FIG. 7.

FIG. 10 shows the structure of the $m_1$ calculator 17 which is composed of a full adder (FA) 104, a multiplier (MUL) 105, a subtractor (SUB) 106, and a divider (DIV) 107. In the $m_1$ calculator 17, the dividend of the divider 107 is $M+v$ ($=M+\tan \alpha$), which is provided by the full adder (FA) 104, and the divisor of the divider 107 is $1-Mv(=1-M\tan \alpha)$, which is provided by the multiplier (MUL) 105 and the subtractor (SUB) 106, thus the divider 107 provides the quotient $(M+v)/(1-Mv)$. The embodiment of the full adder 104 is for instance the integrated circuit SN7483 produced by Texas Instrument Co, Ltd. The structure of the multiplier 105 will be shown in later.

Figure 11:
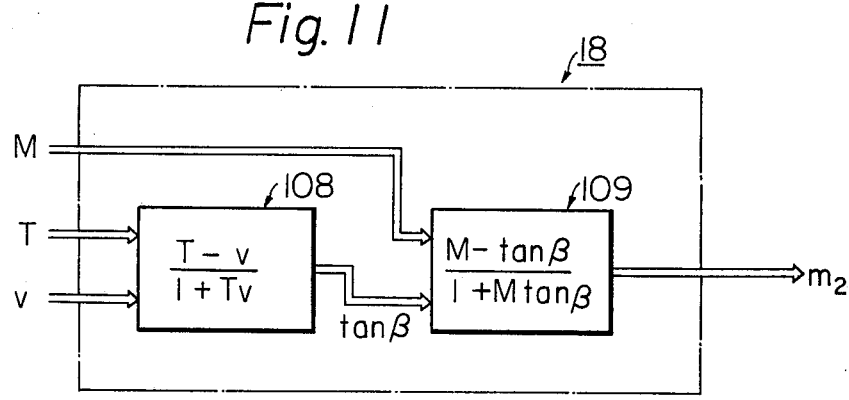
FIG. 11 is a block-diagram of an $m_2$ calculator 18 in FIG. 7.

FIG. 11 is the detailed block-diagram of the $m_2$ calculator 18, which comprises a pair of calculators 108 and 109. Each calculator calculates the formula $(A-B)/(1+AB)$ where A and B are variables. The first calculator 108 receives the value $T(=\tan (\theta_1+\theta_2)/2)$, and $v(=\tan \alpha)$, and provides the output $\tan \beta$ ($=(T-v)/(1+Tv)$). The second calculator 109 receives the $\tan \beta$ thus obtained and the value M, and provides the value of $m_2=(M-\tan \beta)/(1+M\tan \beta)$.

Figure 12:
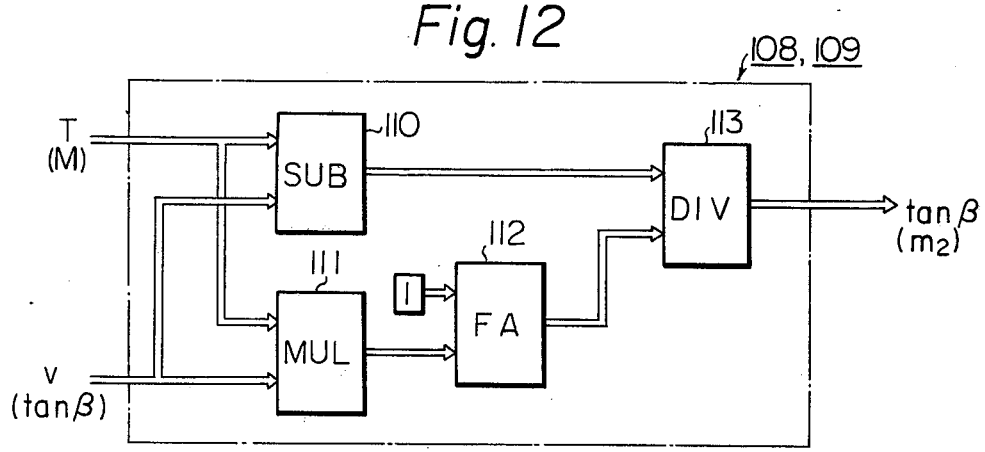
FIG. 12 is a block-diagram of the unit in the $m_2$ calculator 18 in FIG. 11.

FIG. 12 shows the detailed block-diagram of the calculators 108 and 109 in FIG. 11. The calculators 108 and 109 are composed of a subtractor (SUB) 110, a multiplier (MUL) 111, a full adder (FA) 112, and a divider (DIV) 113. The divider 113 receives the value $T-v$ (or $M-\tan \beta$) from the subtractor (SUB) 110 as dividend, and the value $1+Tv$ (or $1+M\tan \beta$) from the multiplier (MUL) 111 and the full adder (FA) 112 as divisor. Thus, the divider 113 provides the quotient $\tan \beta=(T-v)/(1+Tv)$, or $m_2=(M-\tan \beta)/(1+M\tan \beta)$.

Figure 13:
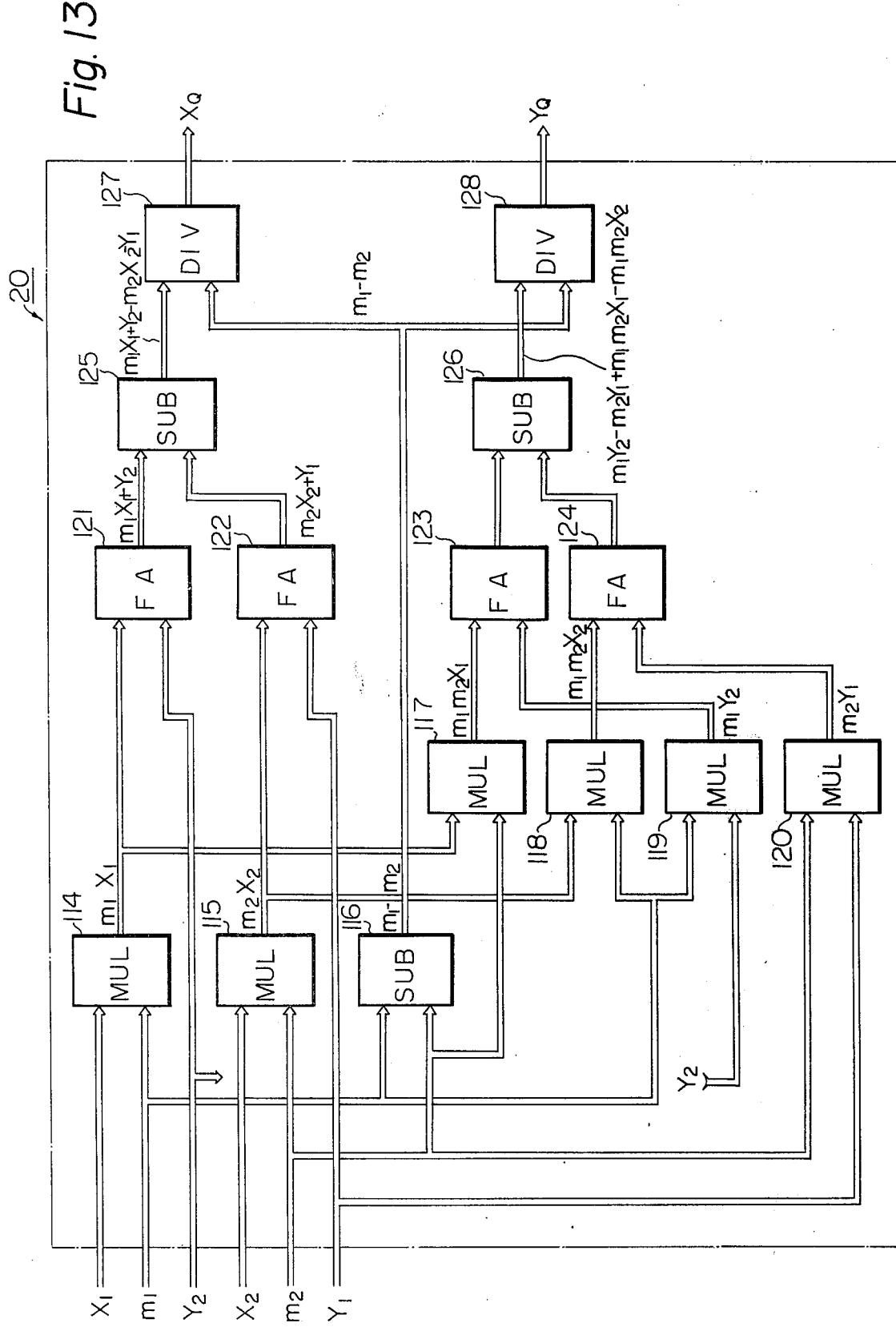
FIG. 13 is a block-diagram of a junction point calculator (Q calculator) 20 in FIG. 7.

FIG. 13 shows the detailed embodiment of the Q calculator 20, which is composed of six multipliers (MUL) 114, 115, 117, 118, 119 and 120, three subtractors (SUB) 116, 125 and 126, four full adders (FA) 121, 122, 123, 124, and two dividers (DIV) 127 and 128. The Q calculator 20 receives the input signals $m_1$, $m_2$, $X_1$, $Y_1$, $X_2$ and $Y_2$. The divider (DIV) 127 receives the value $m_1X_1+Y_2-m_2X_2-Y_1$ as dividend, and the value $m_1-m_2$ as divisor, and said divider (DIV) 127 provides the quotient $$X_q = \frac{m_1X_1 + Y_2 - m_2X_2 - Y_1}{m_1 - m_2}$$

of the X coordinate of the point Q.

Similarly, the divider (DIV) 128 receives the value $m_1m_2X_1+m_1Y_2-m_1m_2X_2-m_2Y_1$ as the dividend, and the value $m_1-m_2$ as the divisor, then provides the quotient of the Y coordinate $$Y_q = \frac{m_1m_2X_1 + m_1Y_2 - m_1m_2X_2 - m_2Y_1}{m_1 - m_2}$$

of the point Q. It should be appreciated that the structure of the subtractors, the multipliers and the dividers is completely the same as that used in the $m_1$ calculator 17 or $m_2$ calculator 18.

Figure 14:
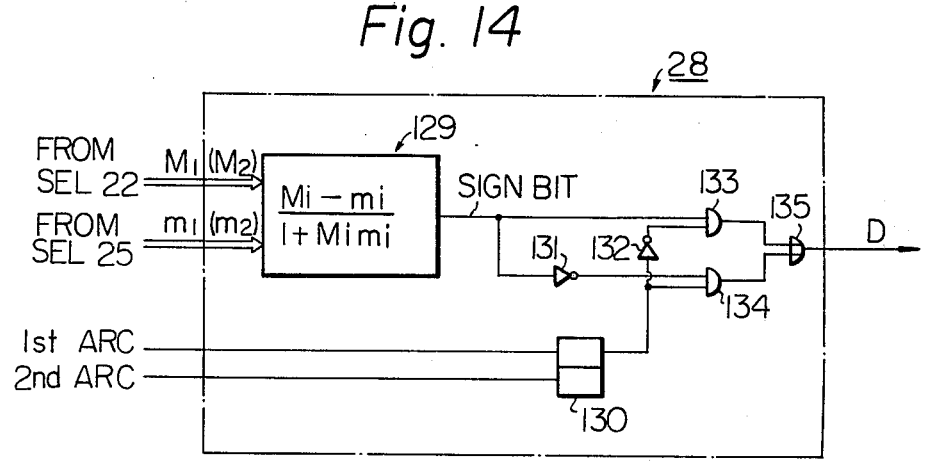
FIG. 14 is a block-diagram of a direction circuit 28 in FIG. 7, FIG. 15, FIG. 16 and FIG. 17 are block-diagrams of a subtractor, a multiplier and a divider, respectively, used in the above calculators.

FIG. 14 shows the block-diagram of the direction circuit 28, which comprises the calculator 129 for the calculation of $(A-B)/(1+AB)$ shown in FIG. 12, a flip-flop 130, inverters 131 and 132, AND circuits 133 and 134, and OR circuit 135. In selecting the revolutional direction of the first arc, the calculator 129 receives the values $M_1$ and $m_1$ from the selectors 22 and 25, and then the calculator 129 calculates $(M_1-m_1)/(1+M_1m_1)$ and the sign of the same. Further, the binary counter 30 (FIG. 7) applys the information as to whether the arc is the first or the second one to the direction circuit 28. When the arc is the first arc, the output of the flip-flop 130 is zero., therefore, the output of the calculator 129 is directly provided to an outside circuit without changing the sign. On the other hand when the arc is the second arc, the values $M_2$ and $m_2$ are applied to the direction circuit 29 from the selectors 22 and 25 (FIG. 7), and the calculator 129 calculates the value $(M_2-m_2)/(1+M_2 m_2)$ and the sign of the same. And further the output of the flip-flop 130 is one "1" during the second arc concerns, and thus the output of the calculator 129 is inverted by passing through the inverter 131, and the inverted output is provided to an outside circuit.

Now, the structure of the subtractor (SUB) 101, 102, 106, 110, 116, 125 and 126, the multiplier (MUL) 105, 111, 114, 115, 117, 118, 119 and 120, the divider (DIV) 103, 107, 113 127 and 128 will be explained.

Figure 15:
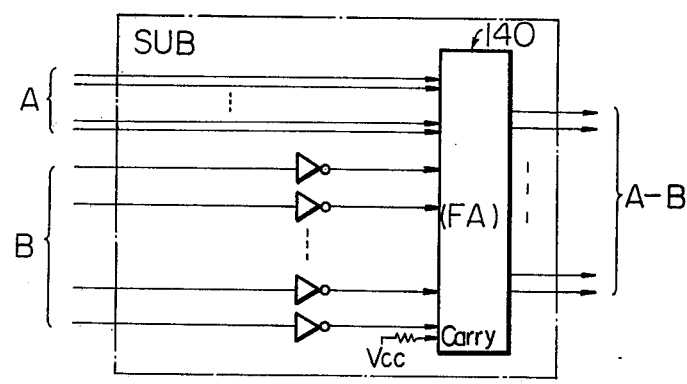

FIG. 15 shows the block-diagram of the subtractor (SUB), which comprises a full adder (FA) 140 and a plurality of inverters. The minuend A is directly applied to the full adder (FA) 140, while the subtrahend B is applied to the full adder (FA) 140 through the inverters, together with the carry. The inverters and the carry change the value B to the 2's complement of the same. Thus, the full adder (FA) 140 provides the difference $A-B$, instead of $A+B$.

Figure 16:
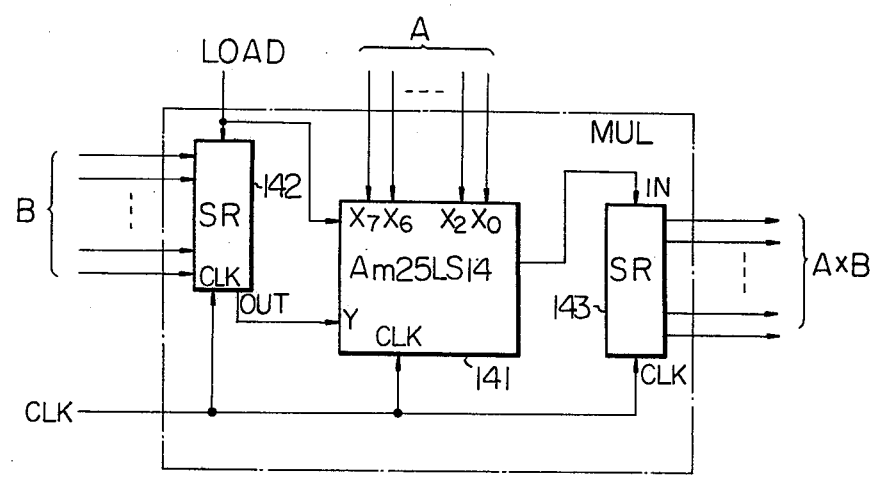

FIG. 16 shows the embodiment of the multiplier (MUL), which comprises the integrated circuit 141 for multiplier, for instance, Am 25LS14 produced by Advanced Micro Devices Co, Ltd, a parallel-in-serial-out shift register 142, a serial-in-parallel-out shift register 143. The shift registers 142 and 143 can be, for instance, the integrated circuits SN74165, and SN74164, produced by Texas Instrument Co, Ltd, respectively. The multiplicand A and the multiplier B can be applied to the present multiplier in a parallel form. Since the integrated circuit 141 for the multiplier is designed to receive the mutliplier in a serial form, a clock signal CLK is necessary for converting the parallel input signal to the serial input signal. It should be appreciated that many integrated circuits for multiplication other than Am 25LS14 are available on the market.

Figure 17:
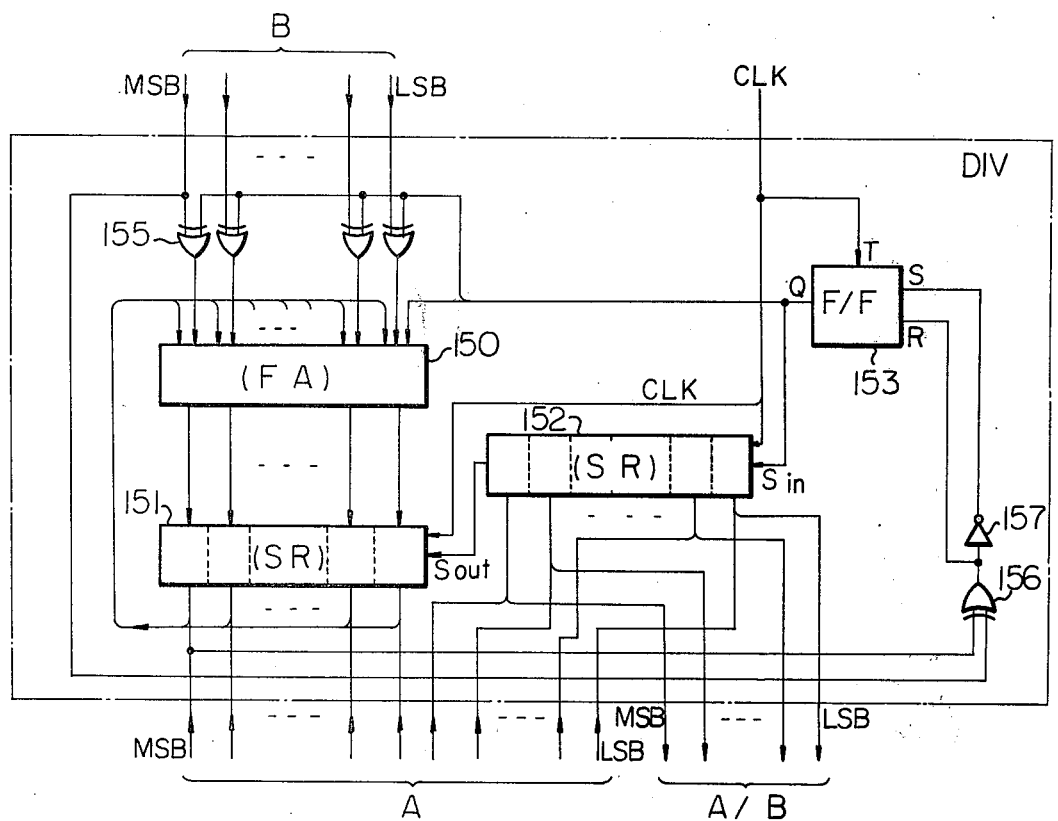

FIG. 17 shows the embodiment of the divider (DIV), which is based on a non-restoring method. The divider (DIV) comprises a full adder (FA) 150, a pair of shift registers (SR) 151 and 152, a flip-flop (F/F) 153, and provides the quotient A/B from the dividend A and the divisor B. The integrated circuit SN74198 produced by Texas Instrument Co, Ltd, can be used as said shift registers 151 and 152. In FIG. 17, the exclusive OR circuit 156 determines whether the sign of the divisor coincides with the sign of a partial remainder, and if they coincide the flip-flop 153 is reset to zero, accomplishing the subtraction and the bit of the quotient is set to one. On the other hand, if the sign of the divisor does not coincide with the sign of the partial remainder, the addition is accomplished and the bit of the quotient is set to zero. Next, the divisor is shifted by one bit. The operation of the division is accomplished by repeating the above cycle.

As explained above in detail, the present invention can provide a smooth curve with a pair of arcs between two points, which could have been connected with only a Spline curve or a high order polynominal in a prior art. Further, in a prior art, a Spline curve generator could not be realized due to the complex structure of the same, a curve has been approximated with a plurality of short linear lines, and so a considerable amount of data has been required in a prior art. On the other hand, since the present invention uses only a pair of simple arcs, the necessary data for generating a curve is merely 1/10 to 1/50 of the necessary data in a prior art. Further, the generated curve according to the present invention is smoother than that of a prior art.

Accordingly, the present invention can be used in a CRT graphic display unit, an X—Y plotter, and/or a numerical control (NC) system, which displays, draws or cuts a smooth curve. Further, the present invention has the effect that the amount of the memory in a computer system can be reduced and the transmission time for sending or receiving the information concerning a curve can be shortened, since the amount of data for defining a curve is reduced in the present invention.

From the foregoing it will now be apparent that a new and improved curve generator has been found. It should be understood of course that the embodiments disclosed are merely illustrative and are not intended to limit the scope of the invention. Reference should be made to the appended claims therefore rather than the specification as indicating the scope of the invention.

What is claimed is:

1. A curve generator for generating a smooth curve with a pair of circular arcs between a start point $P_1$ and an end point $P_2$ where the generated curve is tangent to given tangent lines $M_1$ and $M_2$ at said points $P_1$ and $P_2$, said curve generator comprising selecting means for selecting a point Q which is the smooth junction point of a pair of arcs on the locus satisfying the formula:

$$\angle P_1 Q P_2 = \pi - \tfrac{1}{2}(\theta_1 + \theta_2)$$

where $\theta_1$ and $\theta_2$ are the angles between the line $\overline{P_1,P_2}$ and the tangent lines $M_1$ and $M_2$ respectively, decision means for deciding the revolutional direction of said arcs, and generating means coupled to said selecting means and said decision means for generating said two arcs.

2. A curve generator according to claim 1 wherein the coordinates of the point $Q(X_q, Y_q)$ are obtained by the formula:

$$X_q = \frac{Y_2 - Y_1 + m_1 X_1 - m_2 X_2}{m_1 - m_2}$$

$$Y_q = \frac{m_1 Y_2 - m_2 Y_1 + m_1 m_2 X_1 - m_1 m_2 X_2}{m_1 - m_2}$$

where $X_1$ and $Y_1$ are coordinates of the point $P_1$, $X_2$ and $Y_2$ are coordinates of the point $P_2$, $m_1=(M+\tan \alpha)/(1-M\tan \alpha)$, $m_2=(M-\tan \beta)/(1+M\tan \beta)$, $\tan \beta=(T-\tan \alpha)/(1+T\tan \alpha)$, $T=\tan(\theta_1+\theta_2)/2$, $M=Y_2-Y_1/X_2-X_1$, $\tan \alpha$ is the parameter, and the revolutional direction of the arcs is defined according to the sign of $D_1=(M_1-m_1)/(1+M_1 m_1)$ and $D_2=(M_2-m_2)/(1+M_2 m_2)$.

3. A curve generator according to claim 1 wherein said selecting means and said decision means includes digital calculators for calculating for the coordinates of the point Q and the sign of the values $D_1$ and $D_2$.

4. A curve generator according to claim 3 wherein said digital calculators provide the data concerning two circular arcs in time sequence.

5. A curve generator for generating a curve with a pair of circular arcs between the start point $P_1$ and the end point $P_2$ where the generated curve is tangent to given tangent lines $M_1$ and $M_2$ at said points $P_1$ and $P_2$ respectively, said curve generator comprising:

(a) a $P_1$ register for storing the coordinates $P_1(X_1, Y_1)$;

(b) a $P_2$ register for storing the coordinates $P_2(X_2, Y_2)$;

(c) an $M_1$ register for storing the slope of the tangent to the curve at the starting point;

(d) an $M_2$ register for storing the slope of the tangent to the curve at the end point;

(e) a T register for storing the value $T = \tan(\theta_1 + \theta_2)/2$ where $\theta_1$ and $\theta_2$ are angles between the line $\overline{P_1P_2}$ and said tangent lines;

(f) a V register for storing the parameter $V = \tan \alpha$;

(g) M calculator means coupled to said $P_1$ register and said $P_2$ register for calculating $M = (Y_2 - Y_1)/(X_2 - X_1)$;

(h) $m_1$ calculator means coupled to said V register, said M calculator means for calculating $m_1 = (M + \tan \alpha)/(1 - M \tan \alpha)$;

(i) $m_2$ calculator means coupled to said V register, said M calculator means and said T register for calculating $m_2 = (M - \tan \beta)/(1 + M \tan \beta)$, where $\tan \beta = (T - v)/(1 + Tv)$;

(j) Q calculator means coupled to said $m_1$ and $m_2$ calculator means and said $P_1$ and $P_2$ registers for calculating $$X_q = \frac{Y_2 - Y_1 + m_1 X_1 - m_2 X_2}{m_1 - m_2} \text{ and }$$

$$Y_q = \frac{m_1 Y_2 - m_2 Y_1 + m_1 m_2 X_1 - m_1 m_2 X_2}{m_1 - m_2};$$

(k) $D_1$ calculator means coupled to said $M_1$ register and said $m_1$ calculator means, for calculating $D_1 = (M_1 - m_1)/(1 + M_1 m_1)$;

(l) $D_2$ calculator means coupled to said $M_2$ register and said $m_2$ calculator means, for calculating $D_2 = (M_2 - m_2)/(1 + M_2 m_2)$;

(m) first output means for providing the data concerning the first arc $(P_1(X_1, Y_1), Q(X_q, Y_q), M_1$ and the sign of $D_1)$;

(n) second output means for providing the data concerning the second arc $(Q(X_q, Y_q), P_2(X_2, Y_2), M_2$ and the sign of $D_2)$.

* * * * *